US012138924B2

(12) United States Patent
Shimizu et al.

(10) Patent No.: US 12,138,924 B2
(45) Date of Patent: Nov. 12, 2024

(54) LIQUID EJECTION HEAD AND MANUFACTURING METHOD OF LIQUID EJECTION HEAD

(71) Applicant: CANON KABUSHIKI KAISHA, Tokyo (JP)

(72) Inventors: Naoko Shimizu, Kanagawa (JP); Toru Nakakubo, Kanagawa (JP); Kazuhiro Yamada, Kanagawa (JP); Atsushi Teranishi, Kanagawa (JP); Osamu Kanome, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/485,183

(22) Filed: Oct. 11, 2023

(65) Prior Publication Data

US 2024/0034061 A1 Feb. 1, 2024

Related U.S. Application Data

(63) Continuation of application No. 17/538,775, filed on Nov. 30, 2021, now Pat. No. 11,850,855.

(30) Foreign Application Priority Data

Dec. 3, 2020 (JP) ................................ 2020-201148

(51) Int. Cl.
*B41J 2/14* (2006.01)
*B41J 2/18* (2006.01)

(52) U.S. Cl.
CPC ....... *B41J 2/14145* (2013.01); *B41J 2/14016* (2013.01); *B41J 2/1404* (2013.01); *B41J 2002/14306* (2013.01); *B41J 2/18* (2013.01); *B41J 2202/20* (2013.01); *B41J 2202/21* (2013.01)

(58) Field of Classification Search
CPC .. B41J 2/14145; B41J 2/14016; B41J 2/1404; B41J 2/18; B41J 2002/14306; B41J 2202/20; B41J 2202/21
See application file for complete search history.

(56) References Cited

U.S. PATENT DOCUMENTS

2012/0160925 A1* 6/2012 Hoisington .............. B41J 2/175 239/104

FOREIGN PATENT DOCUMENTS

JP 2019014172 A 1/2019

* cited by examiner

*Primary Examiner* — Geoffrey S Mruk
(74) *Attorney, Agent, or Firm* — Canon U.S.A., Inc. I.P. Division

(57) ABSTRACT

A liquid ejection head includes ejection orifices for ejecting liquid, common liquid chambers connected to the ejection orifices, common flow passages, and pitch conversion flow passages that connects the common flow passages and liquid chambers to each other. The pitch conversion flow passages includes a periphery formed with resin. In a case where a number of pitch conversion flow passages in a group is minimum on a condition that one or more of the pitch conversion flow passages are respectively included in the group, the pitch conversion flow passages have a repeating pattern in which the group is repeatedly arranged. At least one of two pitch conversion flow passages adjoining an m-th pitch conversion flow passage (m is all integers from 1 to n−2, where n is an integer of 3 or more) is one of first to (m+1)-th pitch conversion flow passages.

2 Claims, 12 Drawing Sheets

| | | CONDITION 1 | CONDITION 2 | CONDITION 3 | CONDITION 4 | CONDITION 5 | EFFECT |
|---|---|---|---|---|---|---|---|
| | | C > n | AT LEAST ONE OF TWO FLOW PASSAGES ADJOINING Pm IS ONE OF P1 TO P (m + 1) | THERE IS REGION THAT SATISFIES Cn > n | AT LEAST ONE OF TWO FLOW PASSAGES ADJOINING Pn IS Pn OR P (n - 1) | Q1 > Qn AND Q1 ≥ Q2 ≥ ... ≥ Qn | |
| 3-1 |  P3 P2 P1 P3 P2 P1 P3 P2 P1 P3 P2 P1 | × | ○ | — | — | — | × |
| 3-2 |  P2 P3 P1 P3 P2 P1 P2 P3 P1 P3 P2 P1 | ○ | × | — | — | — | × |
| 3-3 |  P2 P3 P1 P1 P3 P2 P2 P3 P1 P1 P3 P2 | ○ | ○ | × | ○ | × | ○ |
| 3-4 |  P3 P2 P1 P1 P2 P3 P3 P2 P1 P1 P2 P3 | ○ | ○ | ○ | ○ | × | ◎ |
| 3-5 |  P3 P2 P1 P2 P1 P3 P3 P2 P1 P2 P1 P3 | ○ | ○ | ○ | ○ | × | ◎ |
| 3-6 |  P3 P2 P1 P2 P1 P2 P1 P3 P3 P2 P1 P2 P1 P2 P1 P3 | ○ | ○ | ○ | ○ | ○ | ◎ |

| | | CONDITION 1 | CONDITION 2 | CONDITION 3 | CONDITION 4 | CONDITION 5 | EFFECT |
|---|---|---|---|---|---|---|---|
| | | C > n | AT LEAST ONE OF TWO FLOW PASSAGES ADJOINING Pm IS ONE OF P1 TO P (m + 1) | THERE IS REGION THAT SATISFIES Cn > n | AT LEAST ONE OF TWO FLOW PASSAGES ADJOINING Pn IS Pn OR P (n - 1) | Q1 > Qn AND Q1 ≥ Q2 ≥ ... ≥ Qn | |
| 4-1 |  | × | ○ | — | — | — | × |
| 4-2 |  | ○ | × | — | — | — | × |
| 4-3 |  | ○ | ○ | × | ○ | × | ○ |
| 4-4 |  | ○ | ○ | ○ | ○ | × | ◎ |
| 4-5 |  | ○ | ○ | ○ | ○ | × | ◎ |
| 4-6 |  | ○ | ○ | ○ | ○ | ○ | ◎ |

| | | CONDITION 1 | CONDITION 2 | CONDITION 3 | CONDITION 4 | CONDITION 5 | EFFECT |
|---|---|---|---|---|---|---|---|
| | | C > n | AT LEAST ONE OF TWO FLOW PASSAGES ADJOINING Pm IS ONE OF P1 TO P (m + 1) | THERE IS REGION THAT SATISFIES Cn > n | AT LEAST ONE OF TWO FLOW PASSAGES ADJOINING Pn IS Pn OR P (n - 1) | Q1 > Qn AND Q1 ≥ Q2 ≥ ... ≥ Qn | |
| 5-1 |   | × | ○ | — | — | — | × |
| 5-2 |   | ○ | × | — | — | — | × |
| 5-3 |   | ○ | ○ | ○ | × | × | ○ |
| 5-4 |   | ○ | ○ | ○ | ○ | × | ◎ |

LIQUID EJECTION HEAD AND MANUFACTURING METHOD OF LIQUID EJECTION HEAD

CROSS-REFERENCE TO RELATED APPLICATIONS

The present application is a continuation of U.S. patent application Ser. No. 17/538,775, filed on Nov. 30, 2021, now U.S. Pat. No. 11,850,855, which claims priority from Japanese Patent Application No. 2020-201148 filed Dec. 3, 2020, which are hereby incorporated by reference herein in their entireties.

BACKGROUND

Field

The present disclosure relates to a liquid ejection head and a manufacturing method of the liquid ejection head.

Description of the Related Art

In a liquid ejection device, a page-wide type liquid ejection head in which ejection orifices are arranged over the entire width of a recording medium may be used in order to increase the printing speed. In such a liquid ejection head, a pitch conversion flow passage may be used to supply liquid to an element substrate having a plurality of ejection orifice rows. The liquid is supplied from a common flow passage extending in an arrangement direction of the ejection orifice to a common liquid chamber of each element substrate via the pitch conversion flow passage. Molded parts such as resin are often used as a member forming the pitch conversion flow passage.

SUMMARY

According to an aspect of the present disclosure, a liquid ejection head includes a plurality of ejection orifices for ejecting liquid, first to n-th common liquid chambers (n is an integer of 3 or more) arranged in parallel, through which the liquid is to flow, and connected to corresponding ejection orifices of the plurality of ejection orifices, first to n-th common flow passages arranged in parallel in order of first to n-th and through which the liquid is to flow, and first to n-th pitch conversion flow passages connecting the first to n-th common flow passages and the first to n-th common liquid chambers to each other and of which a periphery is formed with resin, wherein the first to n-th common liquid chambers are positioned on a side of the first common flow passage, wherein, in a case where a number of pitch conversion flow passages in a group is minimum on a condition that one or more of the first to n-th pitch conversion flow passages are respectively included in the group, the first to n-th pitch conversion flow passages have a repeating pattern in which the group is repeatedly arranged, wherein the number of pitch conversion flow passages included in the group is greater than n, and wherein at least one of two pitch conversion flow passages adjoining an m-th pitch conversion flow passage (m is all integers from 1 to n−2) is one of first to (m+1)-th pitch conversion flow passages.

Further features of the present disclosure will become apparent from the following description of exemplary embodiments with reference to the attached drawings.

DESCRIPTION OF THE EMBODIMENTS

Figure 1A:
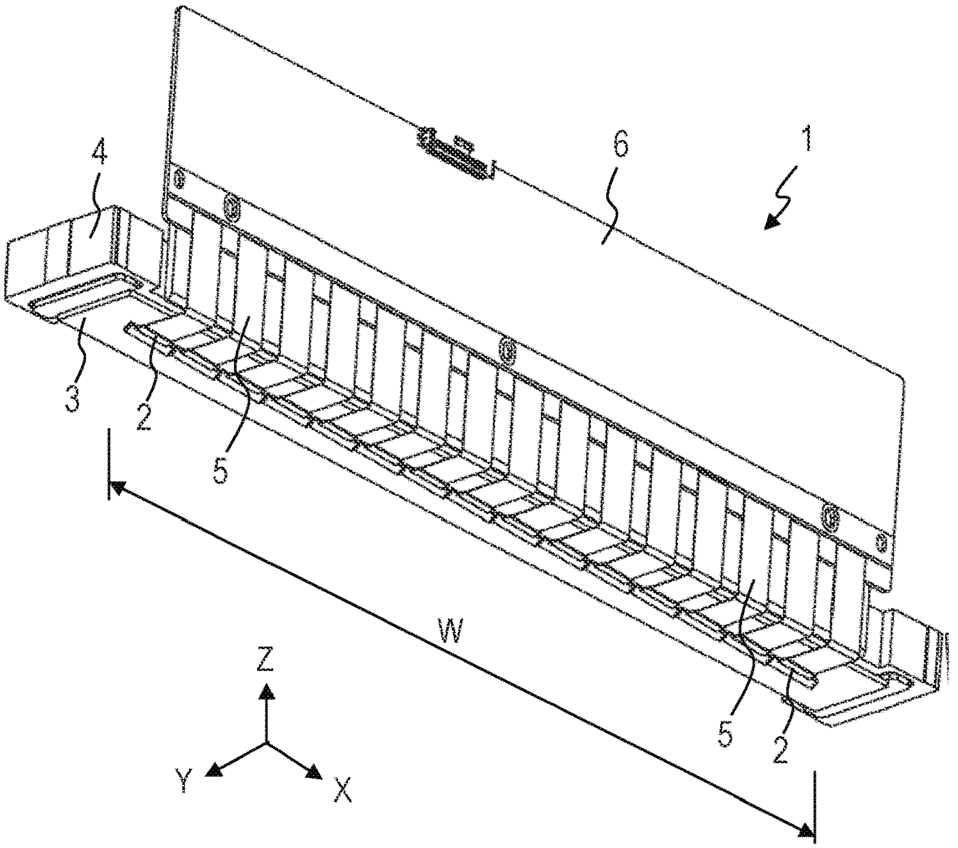
FIG. 1A is a perspective view of a liquid ejection head according to Embodiment 1 of the present disclosure.

In order to increase the density of an ejection orifice for cost reduction, improve printing speed, or increase the number of supply ports for handling high-viscosity liquids, it is required to dispose a pitch conversion flow passage at a high density. In order to reliably join a member in which the pitch conversion flow passage is arranged at a high density to another member, a high flatness is required for a joint surface of the pitch conversion flow passage. However, when the member on which the pitch conversion flow passage is formed is formed by molding resin, the flow of the resin may be obstructed by the complicated configuration of the pitch conversion flow passage, and sink marks may easily occur. As a result, the flatness of the member may deteriorate and the joining reliability of the member may degrade.

Disclosed herein is a liquid ejection head having improved moldability of a member in which a pitch conversion flow passage is formed.

Hereinafter, some embodiments of the present disclosure will be described with reference to the drawings. The embodiments described below do not limit the scope of the present disclosure. In the liquid ejection head of the present embodiment, a thermal method is adopted in which bubbles are generated by a heating resistance element to eject ink. However, the present disclosure can also be applied to a liquid ejection head in which the piezo method and various other liquid ejection methods are adopted as long as the ink can be provided with energy for ejection. In the present embodiment, the liquid is ink, but the liquid is not limited to ink. The liquid ejection head of the present embodiment has an integrated configuration in which ejection orifices are arranged over the entire width of the recording medium, but a plurality of liquid ejection heads may be arranged according to the width of the recording medium.

In the following description, the width direction of the recording medium is referred to as the X direction, and the transport direction of the recording medium is referred to as the Y direction. The X and Y directions are orthogonal. The direction orthogonal to the X and Y directions is referred to as the Z direction. The Z direction coincides with the height direction of the pitch conversion flow passage. The present disclosure is suitably applicable to a line-type liquid ejection head, but is also applicable to a liquid ejection head mounted on a carriage that moves in the width direction of the recording medium. In that case, the X direction may coincide with the transport direction of the recording medium, and the Y direction may coincide with the width direction of the recording medium.

In each embodiment, the liquid ejection head ejects four types of ink (for example, cyan (C), magenta (M), yellow (Y), black (K)). Further, a liquid chamber and a flow passage through which the ink flows are divided into for ink supply and for ink collection. Therefore, in the following description, subscripts a to h may be added to distinguish the type of ink, for ink supply, and for ink collection. The number of ink colors is not limited to four, and n types and n colors (n is an integer of 3 or more) can be used. Therefore, in general, since there are two common liquid chambers, common flow passages, and pitch conversion flow passages for each color, one for supply and the other for collection, it can be said that there are common liquid chambers of the first to second n, common flow passages of the first to second n, and pitch conversion flow passages of the first to second n. Further, the liquid chamber and the flow passage for ink supply, and the liquid chamber and the flow passage for ink collection may be reversed. In the liquid ejection device of the present embodiment, the ink is circulated between the liquid supply unit and the liquid ejection head, but the ink does not have to be circulated. In this case, the liquid chamber and the flow passage for ink collection can be omitted. When it is not necessary to distinguish the type of ink, for ink supply, and for ink collection, the subscripts a to h may be omitted.

Embodiment 1

Figure 1B:
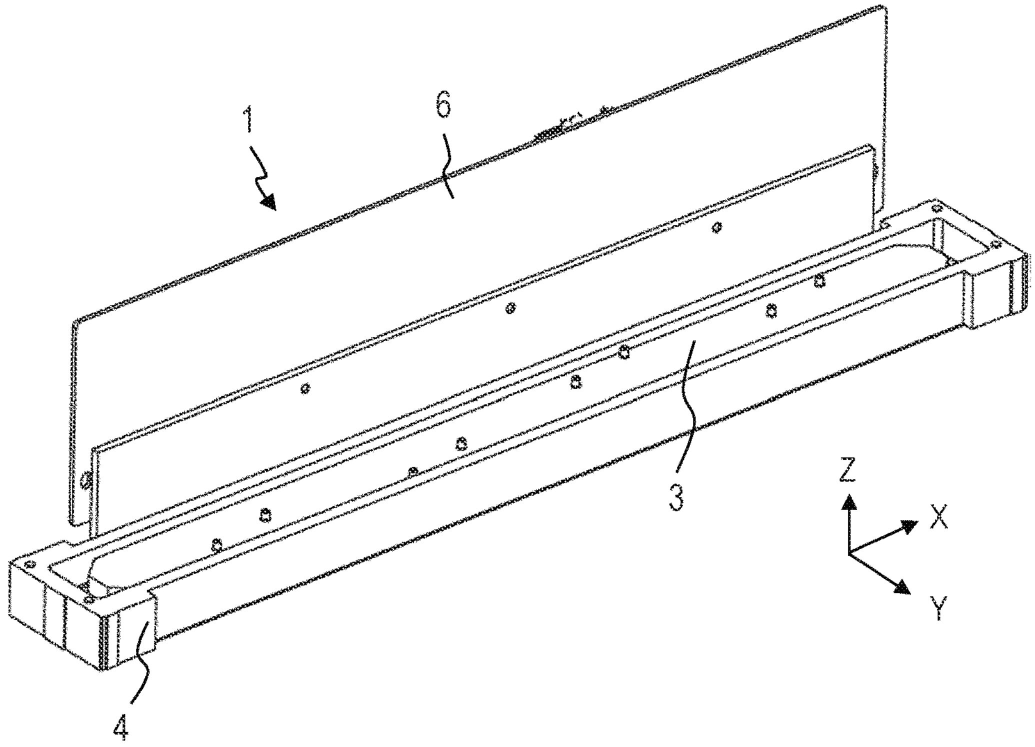
FIG. 1B is a perspective view of the liquid ejection head according to Embodiment 1 of the present disclosure.

FIGS. 1A and 1B are perspective views of a liquid ejection head 1 according to Embodiment 1 of the present disclosure as viewed from an ejection orifice side and a side opposite to the ejection orifice side, respectively. The liquid ejection head 1 includes a plurality of element substrates 2, a liquid flow passage unit 3, a housing 4, a plurality of electrical wiring substrates 5, and an electrical connection substrate 6. The plurality of element substrates 2 and the plurality of electrical wiring substrates 5 are arranged over the entire width W of a recording medium having the maximum recordable width. The plurality of electrical wiring substrates 5 are connected to the corresponding element substrates 2. From a liquid supply unit (not shown) connected to the liquid flow passage unit 3, ink is supplied to the element substrate 2 through the liquid flow passage unit 3 and is collected by the liquid supply unit through the liquid flow passage unit 3 again. An energy generating element 25 (see FIG. 2C) is disposed on the element substrate 2. By driving the energy generating element 25 through the electrical connection substrate 6 and the electrical wiring substrate 5, ink is ejected from the corresponding ejection orifice.

Figure 2A:
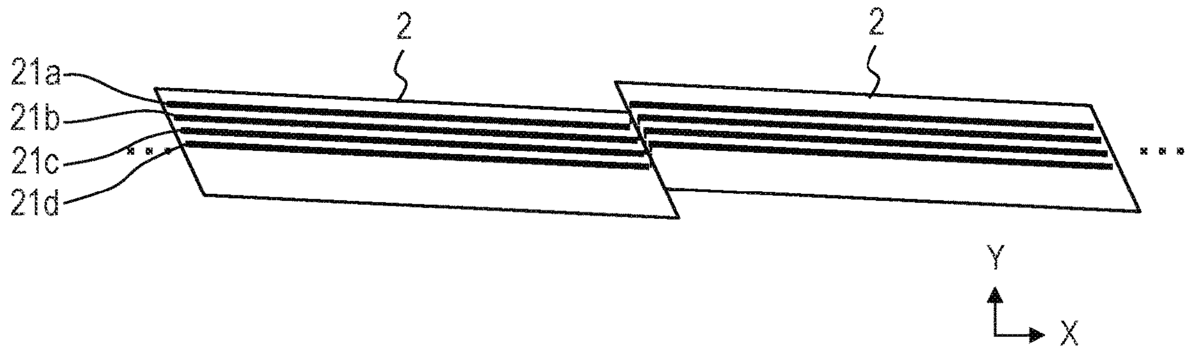
FIG. 2A is a plan view of an element substrate of the liquid ejection head according to Embodiment 1.
Figure 2B:
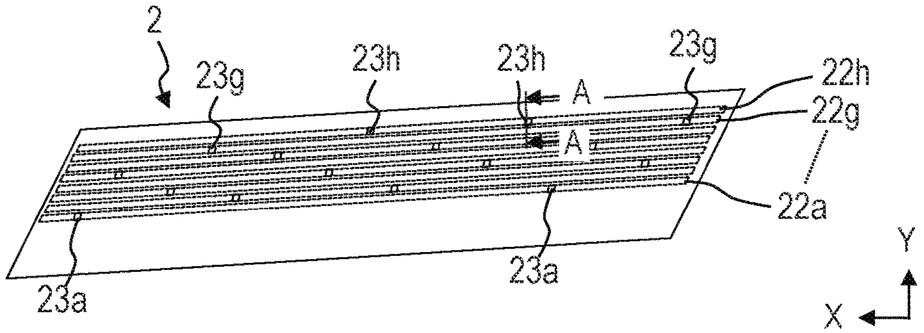
FIG. 2B is a plan view of the element substrate of the liquid ejection head according to Embodiment 1.
Figure 2C:
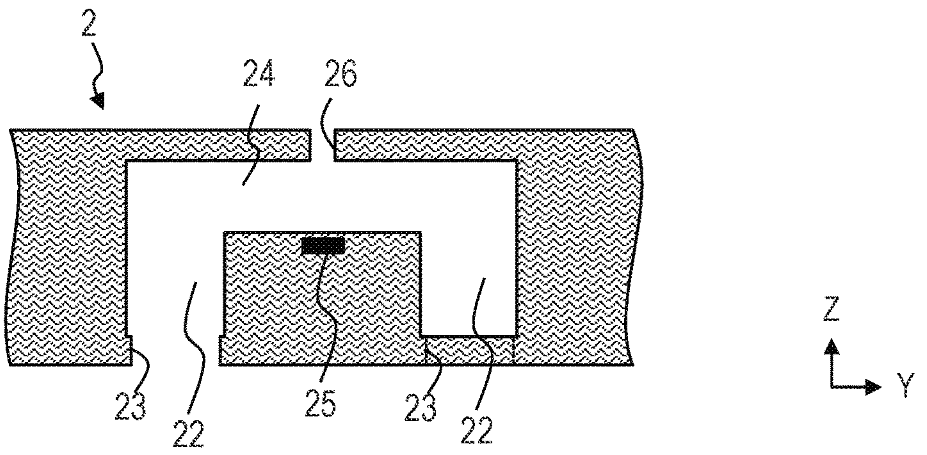
FIG. 2C is a cross-sectional view of the element substrate of the liquid ejection head according to Embodiment 1.

FIG. 2A is a plan view of the element substrate 2 as viewed from an ejection orifice forming surface side, and FIG. 2B is a plan view of the element substrate 2 as viewed from a connection surface side with the liquid flow passage unit 3 (that is, a back side of the ejection orifice forming surface). FIG. 2C is a schematic cross-sectional view illustrating a flow passage in the element substrate 2 taken along the A-A cross section in FIG. 2B. The element substrate 2 has a parallelogram outer shape with four corners having acute angle or obtuse angle. The element substrate 2 is provided with a plurality of ejection orifices 26 corresponding to inks of each color and ejecting inks of each color. The ejection orifice 26 forms rows (ejection orifice rows) 21*a* to 21*d* for each color of the ink to be ejected. Therefore, four rows of ejection orifice rows 21*a* to 21*d* for ejecting four types of ink, and rows of energy generating elements 25 corresponding thereto are arranged on the element substrate 2. The ejection orifice rows 21*a* to 21*d* are arranged so as to be slightly inclined with respect to the X direction but may be parallel to the X direction. The ejection orifice rows for ejecting ink of the same color are arranged continuously over the entire width W of the recording medium, straddling the plurality of element substrates 2.

Figure 3A:
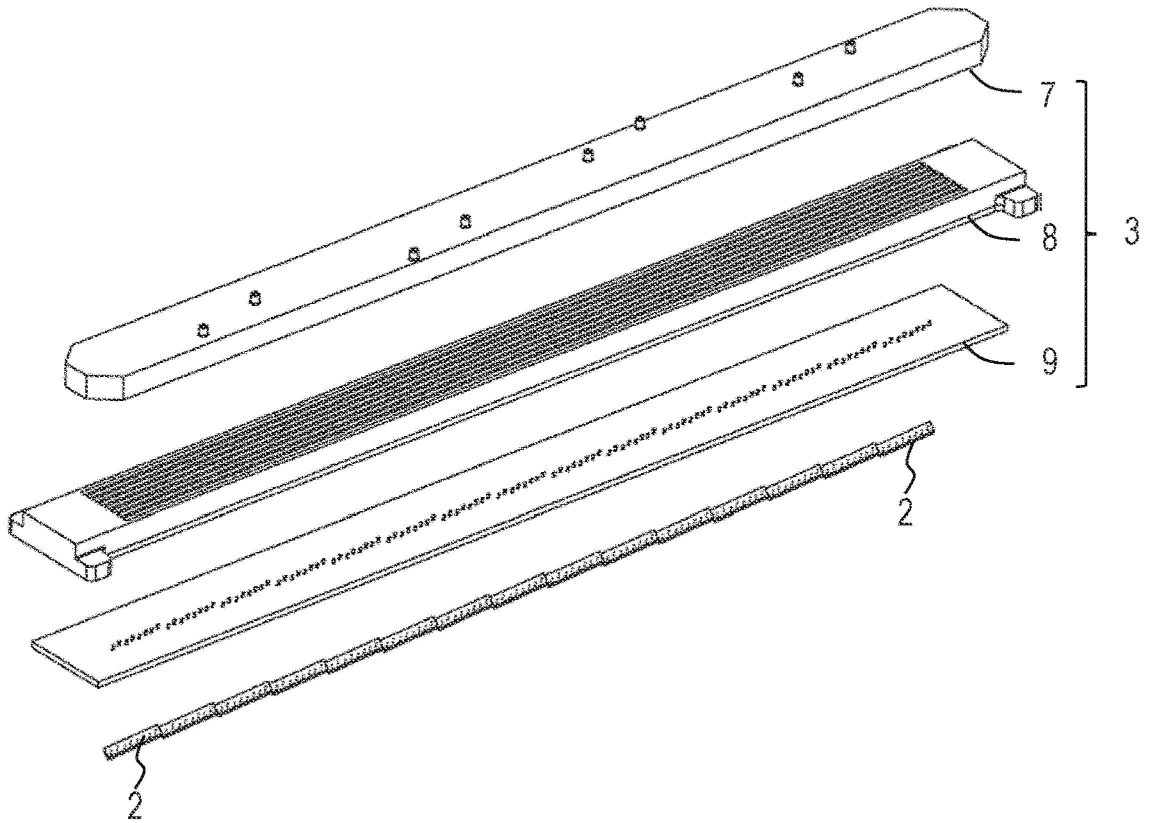
FIG. 3A is a disassembled perspective view of the element substrate and a liquid flow passage unit.
Figure 3B:
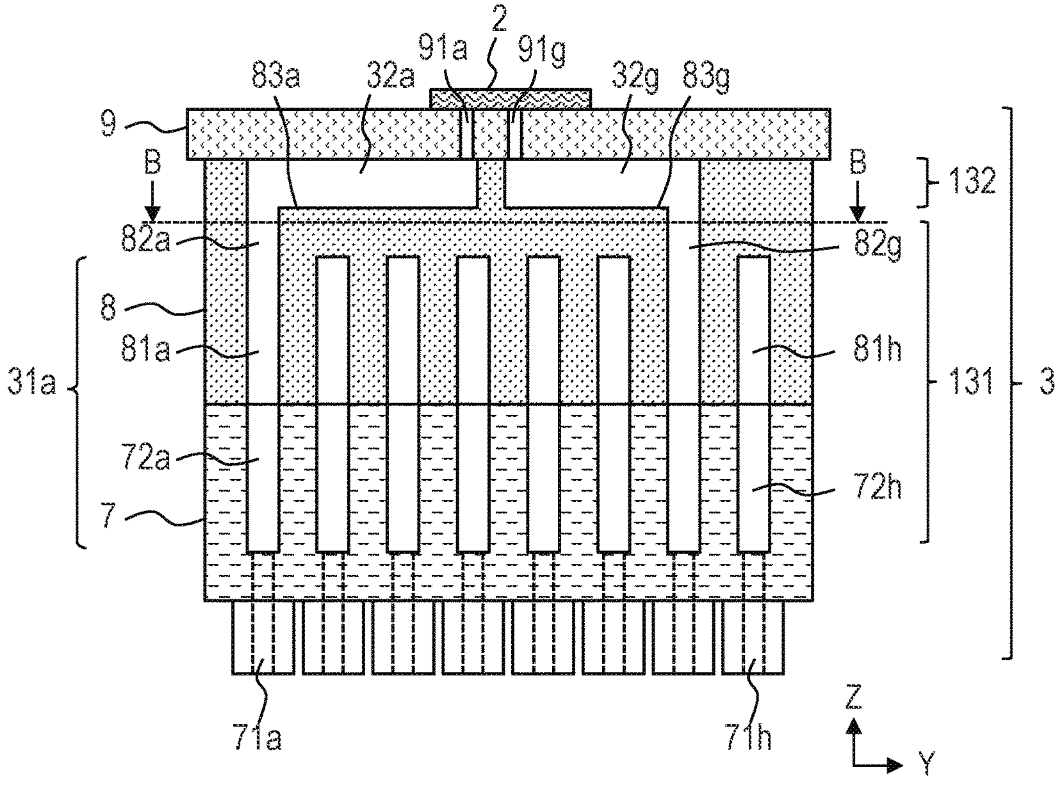
FIG. 3B is a cross-sectional view of the element substrate and the liquid flow passage unit.
Figure 4A:
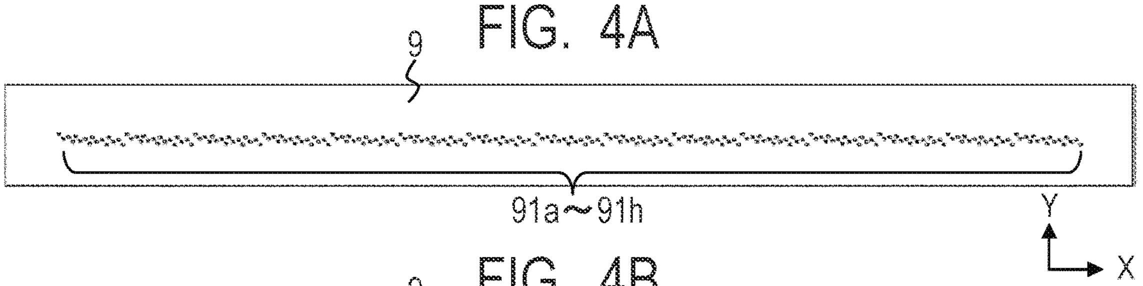
FIG. 4A is a view illustrating disposition of opening of a member configuring the liquid flow passage unit.
Figure 4B:
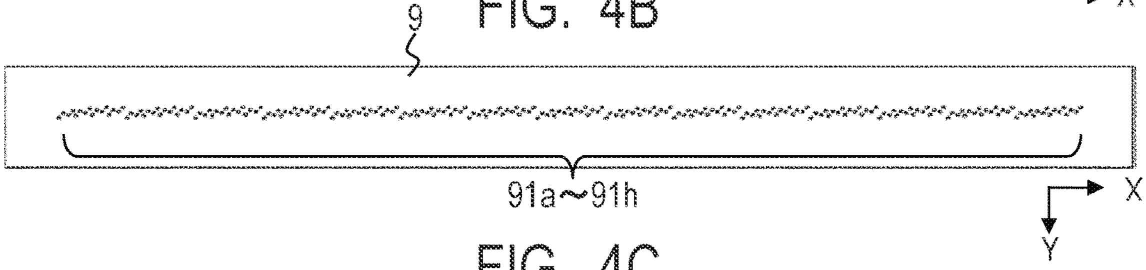
FIG. 4B is a view illustrating disposition of opening of a member configuring the liquid flow passage unit.
Figure 4C:
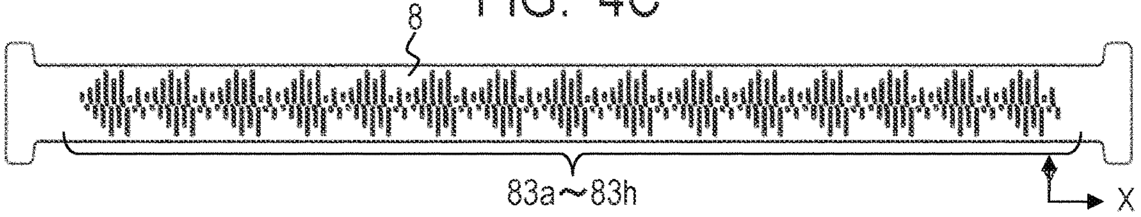
FIG. 4C is a view illustrating disposition of opening of a member configuring the liquid flow passage unit.
Figure 4D:
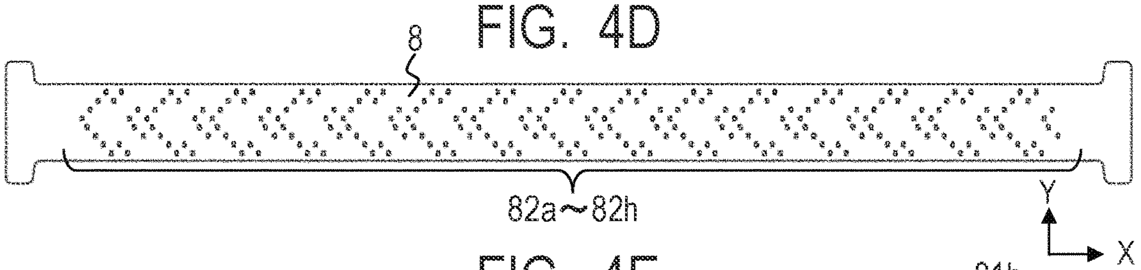
FIG. 4D is a view illustrating disposition of opening of a member configuring the liquid flow passage unit.
Figure 4E:
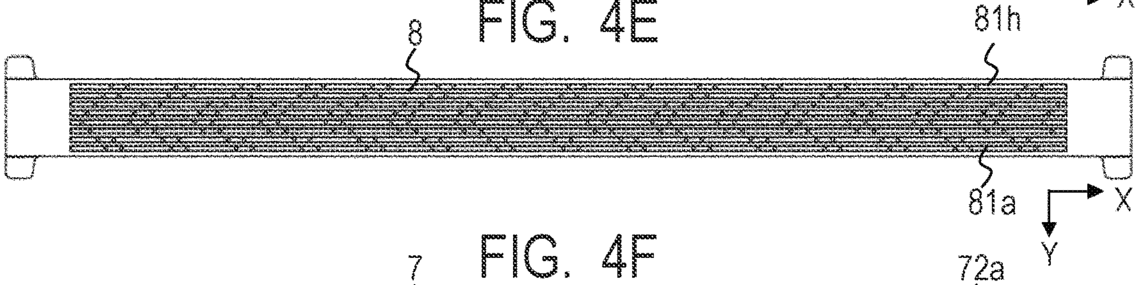
FIG. 4E is a view illustrating disposition of opening of a member configuring the liquid flow passage unit.
Figure 4F:
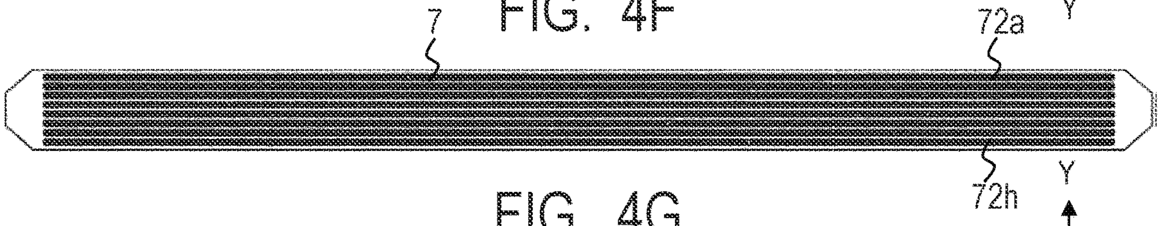
FIG. 4F is a view illustrating disposition of opening of a member configuring the liquid flow passage unit.
Figure 4G:
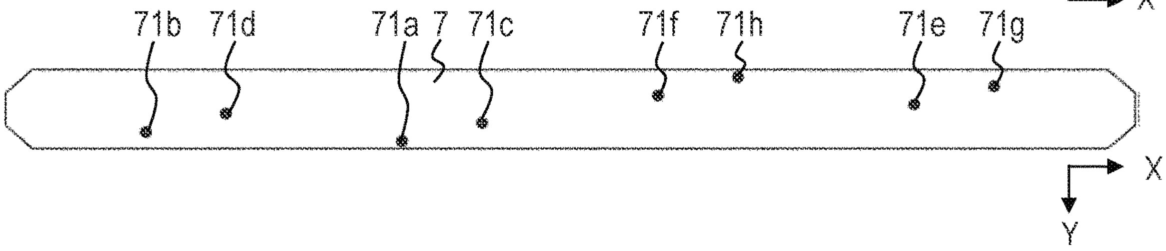
FIG. 4G is a view illustrating disposition of opening of a member configuring the liquid flow passage unit.
Figure 5A:
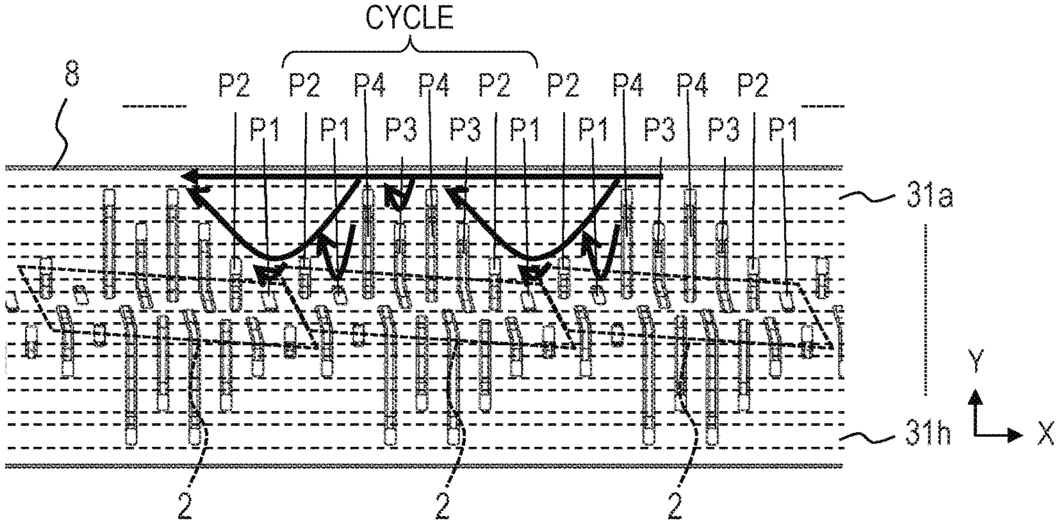
FIG. 5A is a view illustrating disposition of pitch conversion flow passages of Embodiment 1 and a comparative example.

A supply path and a collection path of the ink will be described with reference to FIGS. 2A to 5A. FIG. 3A is a disassembled perspective view illustrating the liquid flow passage unit 3 and the element substrate 2. FIG. 3B is a schematic cross-sectional view of the liquid flow passage unit 3 and the element substrate 2. FIGS. 4A to 4G are views illustrating the disposition of opening of the members configuring the liquid flow passage unit 3. FIGS. 4A and 4B are views respectively illustrating the disposition of opening of the front and back surfaces of the substrate connection member 9, FIGS. 4C and 4E are views respectively illustrating the disposition of opening of the front and back surfaces of the pitch conversion member 8, and FIGS. 4F and 4G are views respectively illustrating the disposition of opening of the front and back surfaces of the common flow passage member 7. When the element substrate 2 side is the front side of each member, FIG. 4D is a cross-sectional view of the pitch conversion member 8 taken along the line B-B in FIG. 3B. FIG. 5A is a schematic view illustrating the disposition of the common flow passages 31*a* to 31*h* and the pitch conversion flow passages 32*a* to 32*h*. The liquid flow passage unit 3 includes three members of a common flow passage member 7, a pitch conversion member 8, and a substrate connection member 9. The pitch conversion member 8 is included in a pitch conversion portion 132 (see FIG. 3B) including the first to fourth pitch conversion flow passages 32*a* to 32*h*. The common flow passage member 7 and the pitch conversion member 8 are included in a common flow passage portion 131 (see FIG. 3B) including the first to fourth common flow passages 31*a* to 31*h*. The common flow passage member 7, the pitch conversion member 8, and the substrate connection member 9 are formed by injection molding of resin. Therefore, the manufacturing method of the liquid ejection head 1 includes forming the periphery of the first to fourth pitch conversion flow passages 32*a* to 32*h* with resin. Of the liquid flow passage unit 3, a part other than the periphery of the pitch conversion flow passage 32 may be formed of a material different from the resin.

As illustrated in FIG. 2C, two common liquid chambers 22 through which the ink flows are provided inside the element substrate 2 for each ink. Eight common liquid chambers 22*a* to 22*h* are arranged in parallel, more specifically in parallel with each other. The common liquid chamber 22 is connected to the corresponding ejection orifice 26 via an individual liquid chamber 24. As illustrated in FIG. 2B, first to fourth opening portions 23*a* to 23*h* are provided on a joint surface of the element substrate 2 with the liquid flow passage unit 3. The opening portion 23 communicates with the common liquid chamber 22 and the common flow passage 31 described later. One or a plurality of opening portions 23*a* to 23*h* are provided, respectively. The ink supplied from the common flow passage 31 flows into the individual liquid chambers 24 through the opening portions 23*a* to 23*d* and the common liquid chambers 22*a* to 22*d*. The ink is further collected in the common flow passages 31*e* to 31*h* through the common liquid chambers 22*e* to 22*h* and the opening portions 23*e* to 23*h*. The individual liquid chamber 24 is provided corresponding to each ejection orifice 26 and each energy generating element 25.

As illustrated in FIGS. 3B and 5A, the liquid flow passage unit 3 includes the first to fourth common flow passages 31*a* to 31*h* through which the ink flows. The common flow passages 31*a* to 31*d* for ink supply are arranged in parallel in the order of the first to fourth, and the common flow passages 31*e* to 31*h* for ink collection are also arranged in parallel in the order of the first to fourth. More specifically, the eight common flow passages 31*a* to 31*h* are arranged in parallel with each other. The common flow passages 31*a* to 31*d* for ink supply are provided in the half portion of the liquid flow passage unit 3 in the Y direction, and the common flow passages 31*e* to 31*h* for ink collection are provided another half portion of the liquid flow passage unit 3 in the Y direction. Further, regarding the common flow passages 31*a* to 31*h*, the fourth common flow passages 31*a* and 31*h* are arranged on the end portion side of the liquid flow passage unit 3 in the Y direction, and the first common flow passages 31*d* and 31*e* are arranged on the central side of the liquid flow passage unit 3 in the Y direction. The element substrate 2 is provided at the central portion of the liquid flow passage unit 3 in the Y direction, and the common liquid chamber 22 is positioned on the side of the first common flow passages 31*d* and 31*e*.

The common flow passage member 7 is provided with first to fourth lower groove portions 72*a* to 72*h* that are a part of the common flow passages 31*a* to 31*h* and first to fourth joint portions 71*a* to 71*h* that connect a liquid supply unit (not shown) and the first lower groove portions 72*a* to 72*h*.

The pitch conversion member 8 is provided with first to fourth upper groove portions 81*a* to 81*h* that are a part of the common flow passages 31*a* to 31*h*. The upper groove portions 81*a* to 81*h* are provided at positions facing the first lower groove portions 72*a* to 72*h*. The common flow passages 31*a* to 31*h* are formed by joining the common flow passage member 7 and the pitch conversion member 8 so that the first lower groove portions 72*a* to 72*h* and the upper groove portions 81*a* to 81*h* communicate with each other. The pitch conversion member 8 is provided with first to fourth pitch conversion flow passage grooves 83*a* to 83*h* forming the first to fourth pitch conversion flow passages 32*a* to 32*h*. As illustrated in FIGS. 3B and 5A, since the width of the element substrate 2 is much narrower as compared with that of the liquid flow passage unit 3, an arrangement pitch of the common liquid chambers 22*a* to 22*h* in the Y direction is smaller than an arrangement pitch of the common flow passages 31*a* to 31*h* in the Y direction. The pitch conversion flow passages 32*a* to 32*h* are provided for converting the arrangement pitch of the common flow passages 31*a* to 31*h* in the Y direction into the arrangement pitch of the common liquid chambers 22*a* to 22*h* in the Y direction. Although the pitch conversion flow passages 32*a* to 32*h* extend in the Y direction, the pitch conversion flow passages 32*a* to 32*h* may extend so as to be inclined with respect to the Y direction. Further, the pitch conversion member 8 is provided with first to fourth communication holes 82*a* to 82*h* in which the first to fourth pitch conversion flow passage grooves 83*a* to 83*h* and the first to fourth upper groove portions 81*a* to 81*h* communicate with each other.

The substrate connection member 9 is provided with first to fourth substrate connection flow passages 91*a* to 91*h* at positions facing the first to fourth opening portions 23*a* to 23*h* of the element substrate 2. End portions of the pitch conversion flow passage grooves 83*a* to 83*h* opposite to the communication holes 82*a* to 82*h* face the substrate connection flow passages 91*a* to 91*h*. The pitch conversion flow passages 32*a* to 32*h* communicating with the substrate connection flow passages 91*a* to 91*h* are formed by joining the pitch conversion member 8 and the substrate connection member 9. With the above configuration, a liquid supply passage is formed that performs the supply of the ink from the liquid flow passage unit 3 to the element substrate 2 and the collection of the ink from the element substrate 2 to the liquid flow passage unit 3.

Figure 5B:
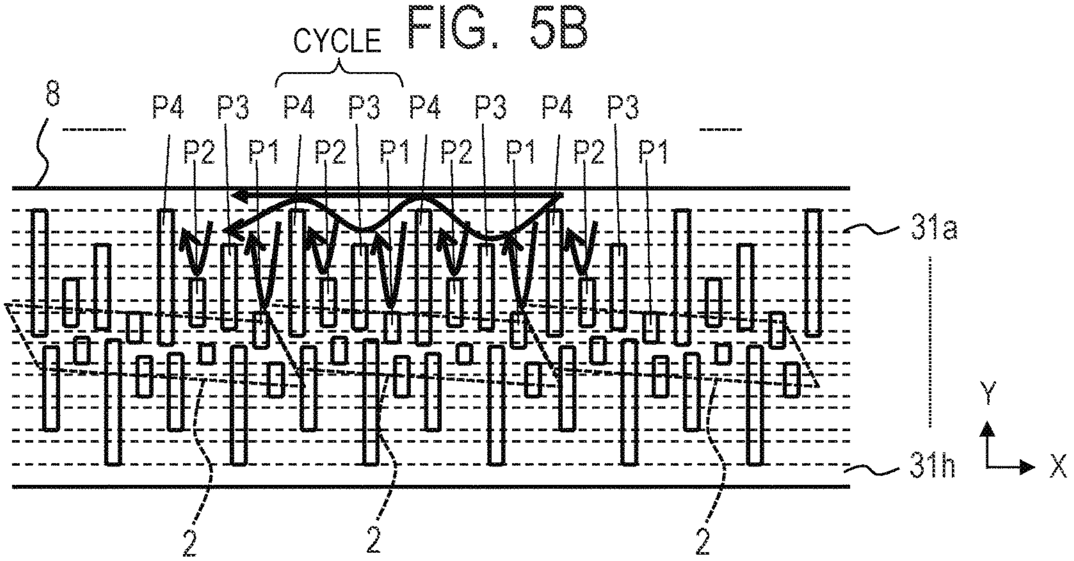
FIG. 5B is a view illustrating disposition of the pitch conversion flow passages of Embodiment 1 and a comparative example.

Subsequently, the arrangement of the pitch conversion flow passages 32*a* to 32*h* is described with reference to FIGS. 5A to 5D. In the following description, the first to fourth pitch conversion flow passages 32*a* to 32*d* are referred to as pitch conversion flow passages P1 to P4. Although the description is omitted, the first to fourth pitch conversion flow passages 32*e* to 32*h* are also configured in the same manner as the first to fourth pitch conversion flow passages 32*a* to 32*d*. FIG. 5B is a schematic view illustrating the disposition of the common flow passages 31*a* to 31*h* and the pitch conversion flow passages P1 to P4 of the comparative example. In the embodiment illustrated in FIG. 5A and the comparative example illustrated in FIG. 5B, the configuration of the common flow passages 31*a* to 31*h* are the same, but the configuration of the pitch conversion flow passages P1 to P4 are different. The pitch conversion flow passages P1 to P4 are arranged along the extending direction (X direction) of the common flow passage 31. The pitch conversion flow passages P1 to P4 connect the common flow passages 31*a* to 31*d* and the common liquid chambers 22*a* to 22*d*. The number of each pitch conversion flow passages P1 to P4 is not limited, but in the present embodiment, a plurality of each of the pitch conversion flow passages P1 to P4 is provided. A ratio of the arrangement pitch of the pitch conversion flow passages P1 to P4 in the X direction to the arrangement pitch of the common flow passages 31*a* to 31*h* in the Y direction is preferably in the range of ⅓ to 3. When the arrangement pitch of the pitch conversion flow passages P1 to P4 in the X direction is too small, the resin filling property degrades, and when the arrangement pitch is too large, the length of the ink flow passage increases, leading to an increase in pressure loss.

In the following description, the number of the common flow passages 31 arranged in either the +Y direction (direction of the arrow) or the −Y direction (reverse direction of the arrow) with respect to the element substrate 2 (the +Y direction in the description in FIGS. 5A and 5B) is defined as n (n is an integer of 3 or more). Further, the pitch conversion flow passages 32 connected to the common flow passages 31 are P1, P2, . . . , and Pn in order from the one closest to the element substrate 2. The arrangement of the pitch conversion flow passages has a repeating pattern in which a "group", where the number of pitch conversion flow passages is minimum on a condition that one or more pitch conversion flow passages P1 to Pn are respectively included, is repeatedly arranged. The minimum number is defined as a repetition cycle C of the arrangement of the pitch conversion flow passages. In the example illustrated in FIG. 5A, C=8 and n=4, and in the example illustrated in FIG. 5B, C=4 and n=4. The pitch conversion flow passages are arranged in one cycle per element substrate 2, but one element substrate 2 may include a plurality of cycles.

Figure 6:
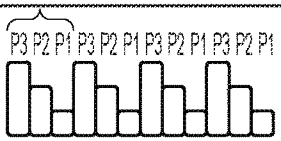
FIG. 6 is a view illustrating a variation (n=3) of disposition of the pitch conversion flow passages.
Figure 6:
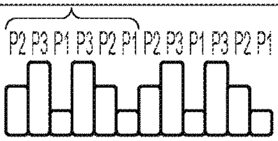
Figure 6:
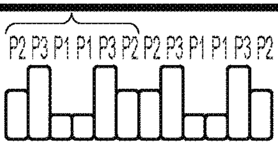
Figure 6:
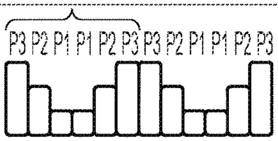
Figure 6:
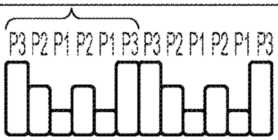
Figure 6:
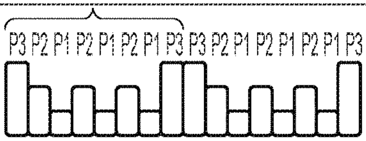
Figure 7:
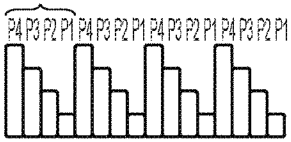
FIG. 7 is a view illustrating a variation (n=4) of disposition of the pitch conversion flow passages.
Figure 7:
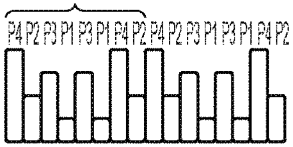
Figure 7:
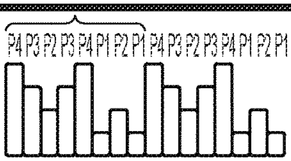
Figure 7:
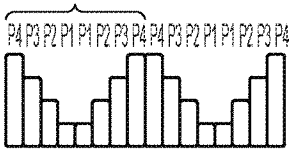
Figure 7:
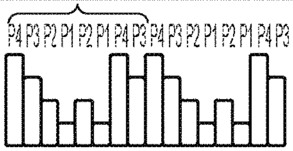
Figure 7:
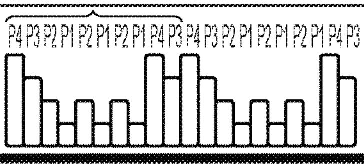
Figure 8:
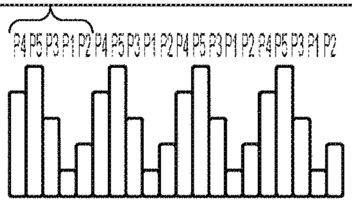
FIG. 8 is a view illustrating a variation (n=5) of disposition of the pitch conversion flow passages.
Figure 8:
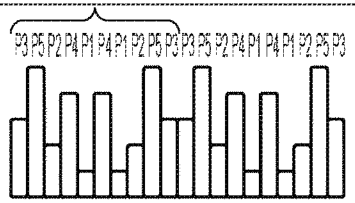
Figure 8:
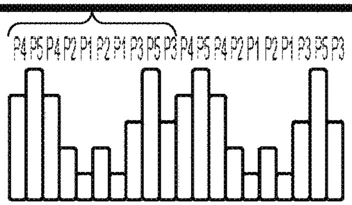
Figure 8:
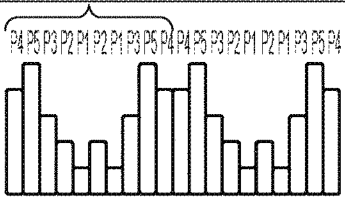

The arrangement of the pitch conversion flow passages P1 to Pn satisfies at least a part of Conditions 1 to 5 described below. Hereinafter, these conditions will be described in detail. Of these conditions, Condition 1 and Condition 2 are essential conditions of the present embodiment, and Conditions 3 to 5 are conditions in which the effect of the present embodiment is further enhanced. The arrangement of the pitch conversion flow passages P1 to Pn is not limited to the examples described below as long as Conditions 1 and 2 are satisfied. Before describing Conditions 1 to 5, FIGS. 6 to 8 will be described. FIGS. 6 to 8 are views of summarizing the variations in the arrangement of the pitch conversion flow passages and the compatibility of Conditions 1 to 5. Cases 3-1 to 3-6 in FIG. 6 are arrangement examples when n=3, cases 4-1 to 4-6 in FIG. 7 are arrangement examples when n=4, and cases 5-1 to 5-4 in FIG. 8 are arrangement examples when n=5. In each figure, the case surrounded by a thick line is an exemplary embodiment, and the other cases are comparative examples.

Condition 1: The number of pitch conversion flow passages P1 to Pn included in one group is larger than n.

That is, C>n in at least a part of a region of the arrangement of the pitch conversion flow passages. In the embodiment illustrated in FIG. 5A, since the pitch conversion flow passages are arranged in the order of P1→P2→P3→P4→P3→P4→P1→P2 in the −X direction, n=4 and C=8, and then C>n. In contrast to this, in the comparative example illustrated in FIG. 5B, since the pitch conversion flow passages are arranged in the order of P1→P3→P2→P4→P1→P3→P2→P4 in the −X direction, n=4 and C=4, thereby C>n is not satisfied.

Condition 2

For any pitch conversion flow passage Pm (m is all integers of 1 to n−2), at least one of the two pitch conversion flow passages adjoining the m-th pitch conversion flow passage Pm, is one of the first to (m+1)-th pitch conversion flow passages P1 to Pm+1.

This condition means that, when a certain pitch conversion flow passage is defined as Px and a pitch conversion flow passage that adjoins on either side of the pitch conversion flow passage Px is defined as Py, two or more common flow passages 31, to which Py is connected, are not positioned outside the common flow passages 31, to which Px is connected, in the Y direction. In other words, it means that the length of at least one of the Py on both sides is not longer than the length of Px by two levels or more. That is, it means that a case where "both the lengths of two Py that adjoin on both sides of Px are two or more levels longer than Px" is excluded. m is all integers from 1 to n−2. The reason why m=n−1 is excluded is that the condition of P1 to P (m+1) is always satisfied regardless of which the pitch conversion flow passage Pn−1 adjoins the pitch conversion flow passages P1 to Pn, and m=n is excluded for the same reason. This condition is satisfied in the embodiment illustrated in FIG. 5A. In contrast to this, in the comparative example illustrated in FIG. 5B, since there is a pitch conversion flow passage P1 on which pitch conversion flow passages P3 and P4 are disposed on both sides thereof, this condition is not satisfied.

Figure 5C:
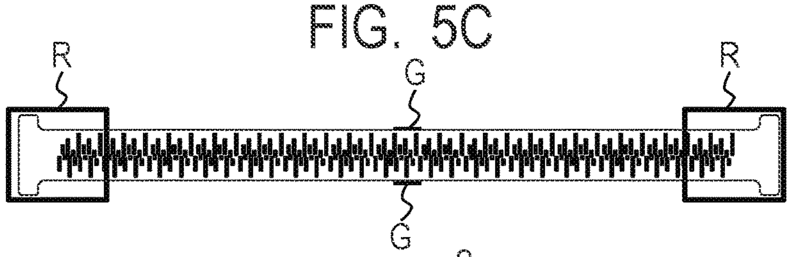
FIG. 5C is a view illustrating disposition of the pitch conversion flow passages of Embodiment 1 and a comparative example.
Figure 5D:
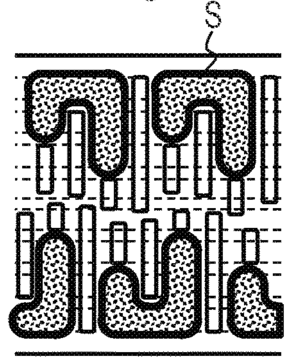
FIG. 5D is a view illustrating disposition of the pitch conversion flow passages of Embodiment 1 and a comparative example.

The effects of Conditions 1 and 2 will be described. In FIGS. 5A and 5B, the flow of the resin at the end portion of the pitch conversion member 8 in the Y direction is indicated by an arrow. In the comparative example illustrated in FIG. 5B, as compare with the resin outside the pitch conversion flow passage P4 flows linearly on an outer peripheral portion, the resin entering the inside of the pitch conversion flow passage P4 repeats complicated branching and merging in a fine cycle. Further, since the pitch conversion flow passage P1 is disposed so as to be interposed between the pitch conversion flow passages P3 and P4, the flow of the resin that penetrates deeply with a narrow width from the outside toward the pitch conversion flow passage P1 is generated in this part. In this way, when the repetition cycle is short (condition 1 is not satisfied) or when a certain pitch conversion flow passage is disposed so as to be sandwiched between the pitch conversion flow passages having significantly longer length than the length thereof (condition 2 is not satisfied), the direction of the flow of the resin changes in small cycles, and the branching and merging of the resin increases. As a result, the narrow region is filled with the resin at a steep angle with respect to the flow of the outer peripheral portion. Thereby, the pressure loss when filling the region with the resin becomes large, and as a result, the pressure is not sufficiently applied at a point far from the gate, and the sink marks may become large. For example, as illustrated in FIG. 5C, when the gate G is provided at the central portion of the pitch conversion member 8 in the longitudinal direction, both end portions in the longitudinal direction are final filling regions R. In the arrangement of the pitch conversion flow passages of the comparative example, the pressure loss from the gate G to the final filling region R of the resin is large, and sufficient pressure cannot be applied in the vicinity of the final filling region R. As a result, sink marks S as illustrated in FIG. 5D may be generated. The sink marks S are recesses on the front surface of the pitch conversion member 8. However, the front surface of the pitch conversion member 8 is also a joint surface with the substrate connection member 9. Therefore, the flatness of the joint surface of the pitch conversion member 8 may deteriorate, resulting in poor joint between the pitch conversion member 8 and the substrate connection member 9.

In contrast to this, in the arrangement of the pitch conversion flow passages of the present embodiment illustrated in FIG. 5A, by setting the repetition cycle C of the arrangement of the pitch conversion flow passages P1 to P4 to 8, which is larger than n (=4), the number of resin branching and merging points is reduced. Further, none of the pitch conversion flow passages P1 to P4 is interposed between the pitch conversion flow passages that have two or more levels longer length than the length thereof. As a result, the angle of branching and merging of the resin becomes gradual, and the filling property of the resin is improved.

With reference to FIGS. 6 to 8, as shown in the cases 3-1, 4-1 and 5-1 (all are comparative examples), in the arrangement where C=n, fluctuations in flow of the resin occur in small cycles, and the pressure loss tends to increase. Further, as shown in the cases 3-2, 4-2, and 5-2 (all are comparative examples), when there is a pitch conversion flow passage that is interposed between pitch conversion flow passages having two or more levels longer length on both sides, the flow of the resin in that part changes rapidly, making the filling difficult. In contrast to this, in the cases 3-3 to 3-6, 4-3 to 4-6, 5-3 to 5-4, by satisfying Conditions 1 and 2 it is possible to realize the flow of the resin in the open region and improve the filling property.

Condition 3: Between n-th pitch conversion flow passages adjacent to each other, n or more pitch conversion flow passages other than the n-th pitch conversion flow passage are arranged.

That is, when an arrangement gap of the longest pitch conversion flow passages Pn is defined as Cn, there is a region where Cn>n. The arrangement gap Cn means that between the pitch conversion flow passages Pn adjacent to each other, there are (Cn−1) pitch conversion flow passages other than Pn. In FIG. 5A, there is a region (Cn=6) in which a total of five pitch conversion flow passages P1, P2, and P3 are interposed between the pitch conversion flow passages P4 adjacent to each other. The cases 3-4 to 3-6, 4-4 to 4-6, 5-3 to 5-4 also satisfy this condition. By satisfying Condition 3, the change in flow of the resin becomes more gradual, and the filling property is improved. At this time, as shown in the cases 3-4 and 4-4, by alternately providing places where P1 to Pn are arranged in descending order and the places where P1 to Pn are arranged in ascending order, the flow of the resin becomes smoother. In other words, the pitch conversion flow passages other than the n-th pitch conversion flow passage interposed between the n-th pitch conversion flow passages includes only one section in which lengths of the pitch conversion flow passages monotonically increase and one section in which the lengths of the pitch conversion flow passages monotonically decrease. In FIG. 5A, a part in which one other pitch conversion flow passage is interposed between the pitch conversion flow passages P4 is generated, but since this pitch conversion flow passage is P3, the condition 2 is satisfied. Therefore, fluctuations in flow of the resin can be suppressed so as to be small.

Condition 4: At least one of the pitch conversion flow passages adjoining the n-th pitch conversion flow passage is another n-th pitch conversion flow passage or (n−1)-th pitch conversion flow passage.

In FIG. 5A, one of the pitch conversion flow passages adjoin the pitch conversion flow passage P4 is a pitch conversion flow passage P3. Note that "adjoining" means that there is no pitch conversion flow passage therebetween, and "adjacent" means that another type of pitch conversion flow passage is interposed therebetween. The cases 3-3 to 3-6, 4-3 to 4-6, and 5-4 also satisfy this condition. By satisfying Condition 4, the change in flow of the resin becomes more gradual and the filling property is improved. In the case 5-3, the longest pitch conversion flow passage P5 protrudes from the pitch conversion flow passages P3 on both sides, but Condition 4 is satisfied in the case 5-4, so the protruding length of the longest pitch conversion flow passage P5 is reduced, and smoother flow of the resin can be realized.

Condition 5: When the number of first to n-th pitch conversion flow passages included in one group is defined as Q1, Q2, . . . , Qn, Q1>Qn and Q1≥Q2≥ . . . ≥Qn are satisfied.

That is, at least one of the first to n-th pitch conversion flow passages is different in number from the other first to n-th pitch conversion flow passages, and the number of long pitch conversion flow passages cannot be larger than the number of shorter pitch conversion flow passages. The present condition means that the number of short pitch conversion flow passages is relatively large with respect to the number of long pitch conversion flow passages. In the case 3-6, there are three pitch conversion flow passages P1 and P2, and two pitch conversion flow passages P3. In the case 4-6, there are three pitch conversion flow passages P1 and P2, and two pitch conversion flow passages P3 and P4. For example, the present condition can be applied when the number of pitch conversion flow passages on the supply side and the collection side are different depending on the ink circulation condition, or when the number of pitch conversion flow passages is different depending on the type of ink for each ejection orifice row 21 and the printing duty used. Since the number of shorter pitch conversion flow passages is increased, the flow of the resin entering the inside at a steep angle from the outer peripheral portion is suppressed, and the effect of the present disclosure is further enhanced.

Further, pitch conversion flow passages of the same type (length) may adjoin each other. As a result, the change in flow of the resin becomes more gradual and the filling property is improved. For example, in the cases 3-3 and 3-4 or the case 4-4, the pitch conversion flow passages P1 are arranged to adjoin each other. When these pitch conversion flow passages P1 are connected to one element substrate 2, the opening portions 23 connected to the common liquid chamber 22 are disposed in close proximity. As a result, a flow distance of the ink in the common liquid chamber 22 becomes long, and the pressure loss may increase. Depending on the usage pattern of the liquid ejection head 1, it is necessary to keep the pressure loss small. In that case, as in the case 3-5 and case 4-5, it is possible to arrange the pitch conversion flow passages of the same type in one element substrate 2 so as not to adjoin each other. These arrangements can be appropriately selected in consideration of the usage pattern.

As described above, according to the present embodiment, the region can be smoothly filled with the resin. This makes it possible to sufficiently transmit pressure even at a point far from the gate. As a result, even when the pitch conversion flow passage is densified, the sink marks are suppressed, and the liquid ejection head 1 can be provided with high joining reliability.

Embodiment 2

Figure 9A:
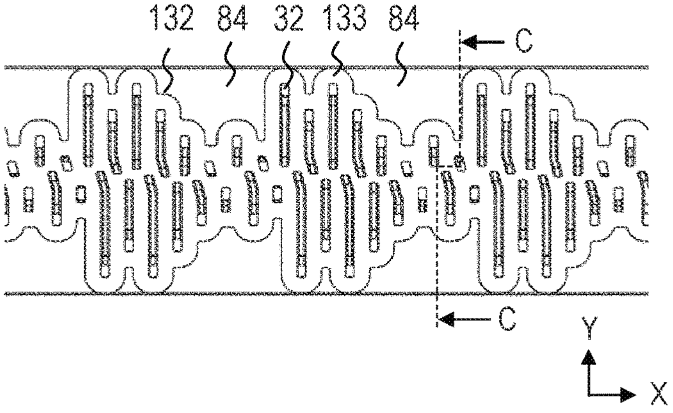
FIG. 9A is a plan view of a liquid flow passage unit according to Embodiment 2 of the present disclosure.
Figure 9B:
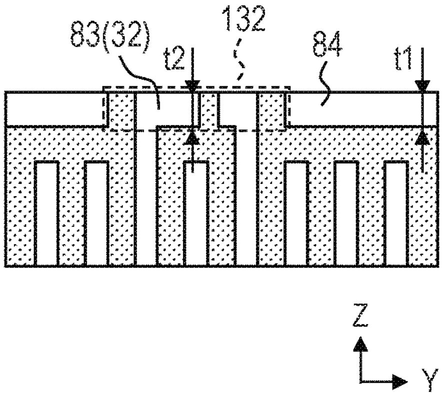
FIG. 9B is a cross-sectional view of the liquid flow passage unit according to Embodiment 2 of the present disclosure.

Embodiment 2 will be described with reference to FIGS. 9A to 9F. Since the overall configuration of the liquid ejection head 1 and the arrangement of the pitch conversion flow passages in Embodiment 2 are the same as those in Embodiment 1, the description thereof will be omitted. FIG. 9A is a plan view of a part of the pitch conversion member 8 seen from the substrate connection member 9 side, and FIG. 9B is a schematic cross-sectional view taken along the C—C cross section in FIG. 9A. In the present embodiment, a joint region 133 having a constant width is provided at the periphery of the pitch conversion flow passage 32 of the pitch conversion portion 132, and a deficit portion 84 of the pitch conversion portion 132 is provided on the outside thereof. The deficit portion 84 of the pitch conversion portion 132 is a space, which is not filled with the resin, overlaps with the common flow passage portion 131, and does not overlap with the pitch conversion portion 132 when viewed from the Z direction. Since the deficit portion 84 is synonymous with a lightening portion, hereinafter, the deficit portion 84 may be referred to as the lightening portion 84 instead of the deficit portion 84.

By providing the lightening portion 84, it is possible to further suppress the sink marks on the pitch conversion member 8. For example, when there is a pitch conversion flow passage interposed between the pitch conversion flow passages having greatly different lengths as in the comparative example illustrated in FIG. 5B, the shape of the lightening portion 84 becomes complicated. Therefore, it may be difficult to provide the lightening portion 84 from the viewpoint of the strength of the mold and the mold release characteristic at the time of molding. In contrast to this, according to the present embodiment, a large lightening portion 84 can be provided, and issues related to the mold strength and the mold release characteristic can be reduced. Further, in the comparative example, even when the lightening portion 84 can be provided, the shape of the flow region of the resin is complicated, and the pressure loss at the time of filling tends to be large. On the other hand, according to the present embodiment, the shape of the flow region of the resin when the lightening portion 84 is provided is simple as compared with the comparative example, and the region can be smoothly filled with the resin. As illustrated in FIG. 9B, the depth (height) t1 of the lightening portion 84 is preferably a depth close to the depth t2 of the pitch conversion flow passage 32 (pitch conversion flow passage groove 83). The depth of the lightening portion (deficit portion) 84 is preferably in the range of 0.5 to 2 times the height of the pitch conversion flow passage 32 (pitch conversion flow passage groove 83). As a method for lowering the mold release resistance, a draft may be provided on the side surface of the lightening portion 84, or an R shape may be provided on the edge.

Figure 9C:
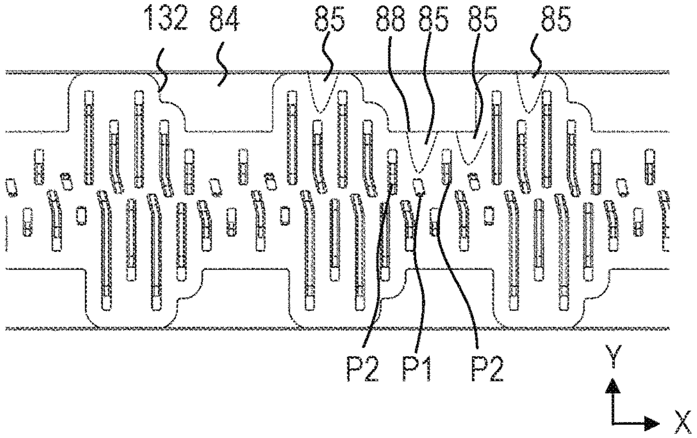
FIG. 9C is a plan view of the liquid flow passage unit according to Embodiment 2 of the present disclosure.
Figure 9D:
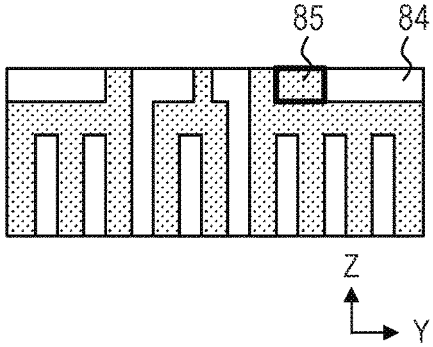
FIG. 9D is a cross-sectional view of the liquid flow passage unit according to Embodiment 2 of the present disclosure.

FIGS. 9C and 9D are similar to FIGS. 9A and 9B, illustrating Modification Example 1 of Embodiment 2. The (i+1)-th pitch conversion flow passages Pi+1 are disposed on both sides of the i-th pitch conversion flow passage Pi (i is an integer smaller than n), and the outer peripheral portion 88 of the pitch conversion portion 132 facing the pitch conversion flow passage Pi and the pitch conversion flow passages Pi+1 on both sides thereof has a linear shape. In the illustrated example, for example, a pitch conversion flow passages P2 are provided on both sides of a pitch conversion flow passage P1, and an outer peripheral portion 88 facing the pitch conversion flow passage P1 and the pitch conversion flow passages P2 is a straight line parallel to the X direction. That is, in the place where pitch conversion flow passages that are longer than a pitch conversion flow passage are disposed on both sides of the pitch conversion flow passage, a resin filling portion 85, in which lightening is not performed, is provided. As a result, the protruding length of the mold into a narrow region is reduced, and the structure becomes easier to mold. Since the volume of the resin of the relevant part increases, the sink marks may expand as compared with the case of lightening, but the difference in length from the adjoining pitch conversion flow passage is small, the effect is minor.

Figure 9E:
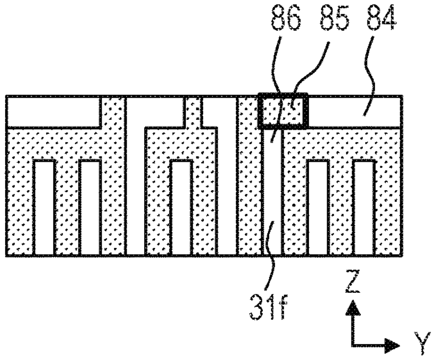
FIG. 9E is a cross-sectional view of the liquid flow passage unit according to Embodiment 2 of the present disclosure.
Figure 9F:
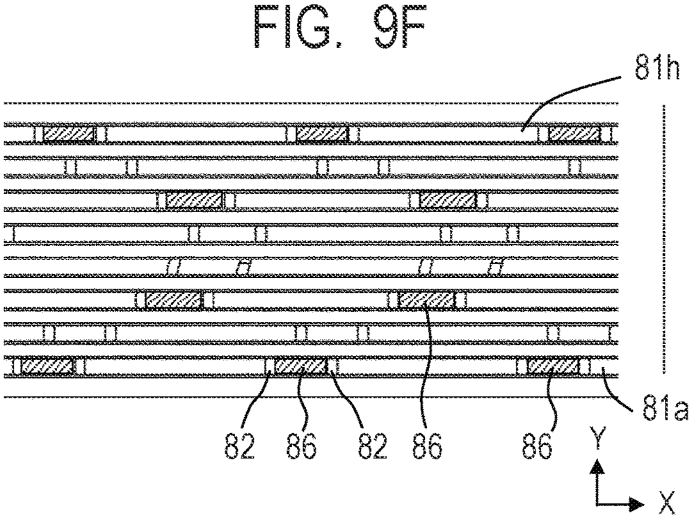
FIG. 9F is a plan view of the liquid flow passage unit according to Embodiment 2 of the present disclosure.

FIGS. 9E and 9F are similar to FIGS. 9A and 9B, illustrating Modification Example 2 of Embodiment 2. Similar to Modification Example 1, the resin filling portion 85 is provided. In FIG. 9E, the depth of the common flow passage **31*f* positioned inside the outer peripheral portion 88 having a linear shape and in the immediate vicinity of the outer peripheral portion 88 when viewed from the Z direction, is deeper than the depth of the other common flow passages 31. The common flow passage 31*f* facing the resin filling portion 85 extends to a region 86, and the thickness of an upper ceiling portion of the common flow passage 31*f* is uniform. As illustrated in a hatching portion in FIG. 9F, the region 86 has an elongated shape in the X direction. By adopting such a configuration, it is possible to reduce an issue of the mold release characteristic of the lightening portion 84**. Further, since the volume of the resin is reduced, it is possible to suppress the deterioration of the sink marks.

Figure 10A:
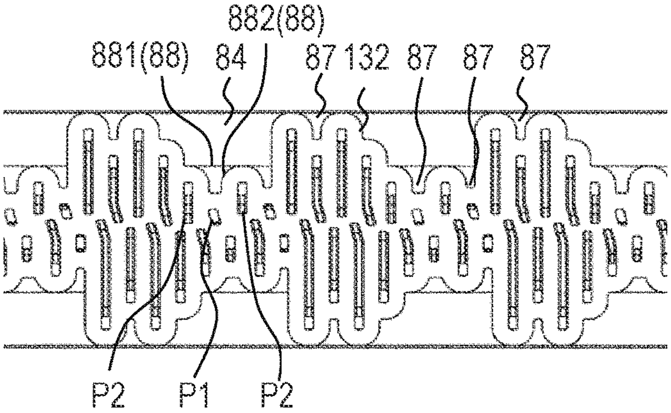
FIG. 10A is a plan view of the liquid flow passage unit according to Embodiment 2 of the present disclosure.
Figure 10B:
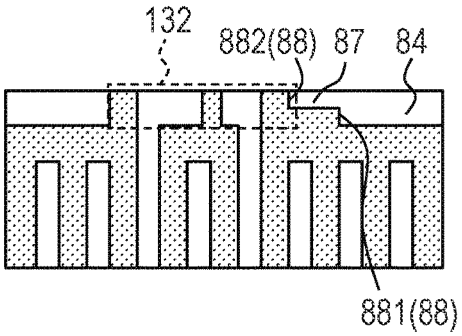
FIG. 10B is a cross-sectional view of the liquid flow passage unit according to Embodiment 2 of the present disclosure.

FIGS. 10A and 10B are similar to FIGS. 9A and 9B, illustrating Modification Example 3 of Embodiment 2. The (i+1)-th pitch conversion flow passages Pi+1 is disposed on both sides of the i-th pitch conversion flow passage Pi (i is an integer smaller than n). In the illustrated example, for example, the pitch conversion flow passages P2 are provided on both sides of the pitch conversion flow passage P1. The outer peripheral portion 88 of the pitch conversion portion 132 facing the pitch conversion flow passage Pi (pitch conversion flow passage P1 in the illustrated example) and the pitch conversion flow passages Pi+1 (pitch conversion flow passages P2 in the illustrated example) on both sides thereof has a step formed by an outside outer peripheral portion 881 and an inside outer peripheral portion 882. That is, at the place where pitch conversion flow passages longer than a pitch conversion flow passage Pi are disposed on both sides of the pitch conversion flow passage Pi, a region 87 having a shallow lightening is provided with respect to other places. The outside outer peripheral portion 881 has a linear shape, and the inside outer peripheral portion 882 is drawn toward the pitch conversion flow passage Pi. According to such a configuration, since the volume of the resin is reduced, it is possible to suppress the deterioration of the sink marks.

Figure 10C:
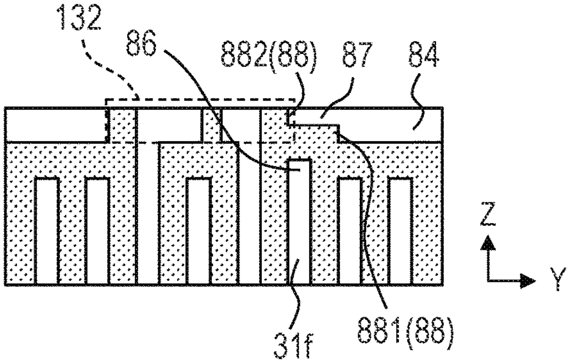
FIG. 10C is a cross-sectional view of the liquid flow passage unit according to Embodiment 2 of the present disclosure.
Figure 10D:
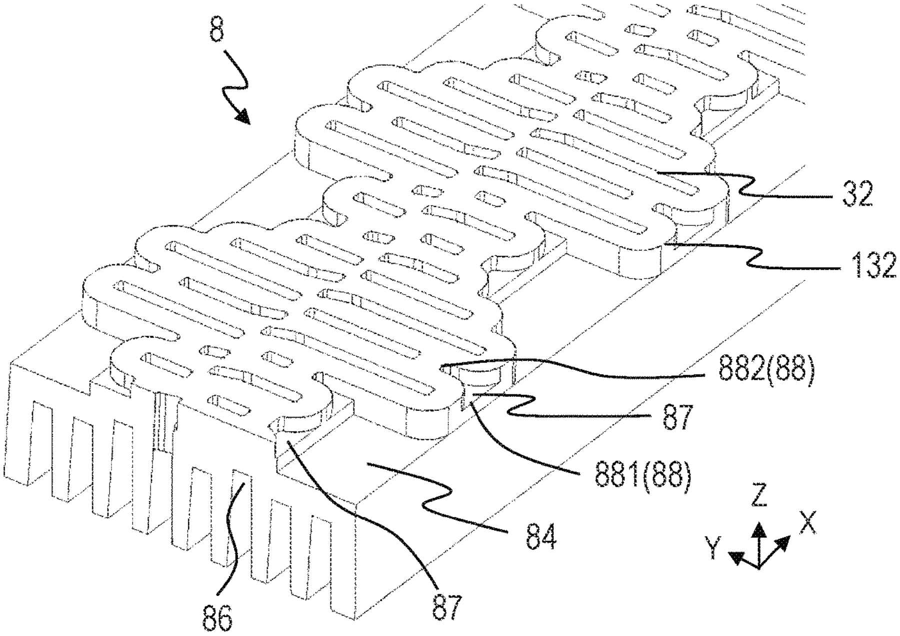
FIG. 10D is a perspective view of the liquid flow passage unit according to Embodiment 2 of the present disclosure.

FIGS. 10C and 10D illustrate Modification Example 4 of Embodiment 2. FIG. 10C is a schematic cross-sectional view of the pitch conversion member 8, and FIG. 10D is a perspective view of the pitch conversion member 8. Similar to Modification Example 2, the depth of the common flow passage 31$f$ positioned inside the outside outer peripheral portion 881 and in the immediate vicinity of the outside outer peripheral portion 881 when viewed from the Z direction, is deeper than the depth of the other common flow passages 31. The present modification example has the same effect as Modification Example 2. As the above modification example, an appropriate one may be selected according to the difficulty of molding and the required level of flatness.

Figure 11A:
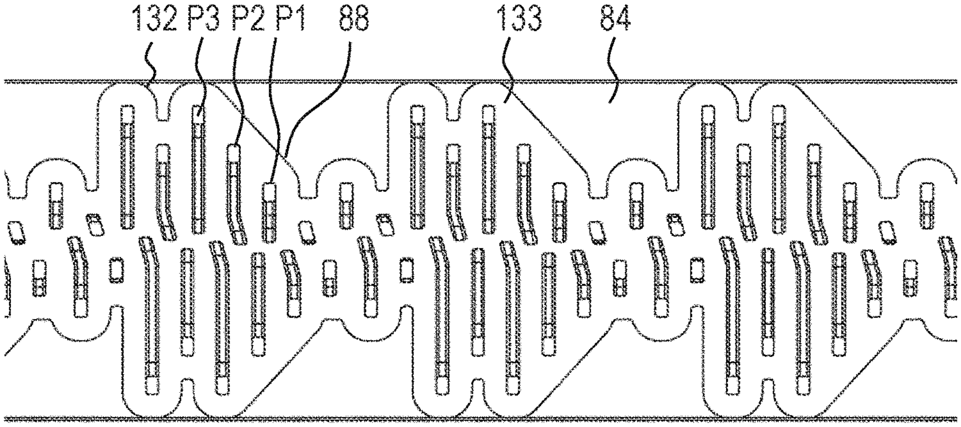
FIG. 11A is a plan view of a liquid flow passage unit according to another modification example.

FIG. 11A is a plan view of a pitch conversion member 8 illustrating Modification Example 5 of Embodiment 2. Any of the first to (i−1-th) pitch conversion flow passages P1 to Pi−1 is disposed on one side of the i-th pitch conversion flow passage Pi (i is an integer smaller than n), and any of the (i+1)-th to n-th pitch conversion flow passages Pi+1 to Pn is disposed on the other side. In the illustrated example, for example, the pitch conversion flow passages P1 and P3 are disposed on both sides of the pitch conversion flow passage P2. The outer peripheral portion 88 of the pitch conversion portion 132 facing the i-th pitch conversion flow passage Pi (pitch conversion flow passage P2 in the illustrated example) and the pitch conversion flow passages (pitch conversion flow passages P1 and P3 in the illustrated example) on both sides thereof has a linear shape. That is, the thickness of a joint region 133 provided at the periphery of the pitch conversion flow passage 32 in the Z direction does not necessarily have to be the same, and the outer peripheral portion 88 may have a smoother shape. This makes it possible to realize the smooth flow of the resin and improve the filling property.

Figure 11B:
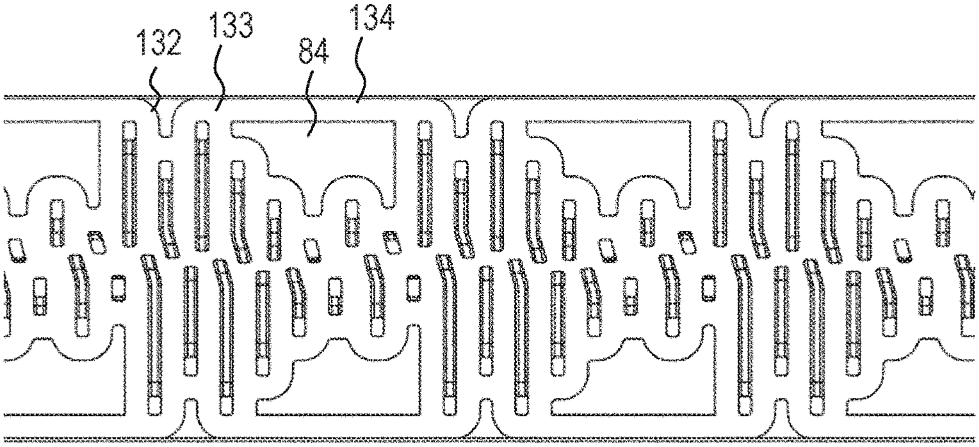
FIG. 11B is a plan view of the liquid flow passage unit according to another modification example.

FIG. 11B is a plan view of a pitch conversion member 8 illustrating Modification Example 6 of Embodiment 2. In the present embodiment, an extension portion 134 that is connected to the pitch conversion portion 132 and surrounds the deficit portion 84 together with the pitch conversion portion 132, is included. Both ends of the extension portion 134 are connected to the pitch conversion portion 132, and the extension portion 134 completely surrounds the deficit portion 84 together with the pitch conversion portion 132. Although not shown, only one end of the extension portion 134 may be connected to the pitch conversion portion 132. Since there is a joint surface having the same height as the joint region 133 in a region away from the periphery of the pitch conversion flow passage 32, the joining property is improved.

Figure 11C:
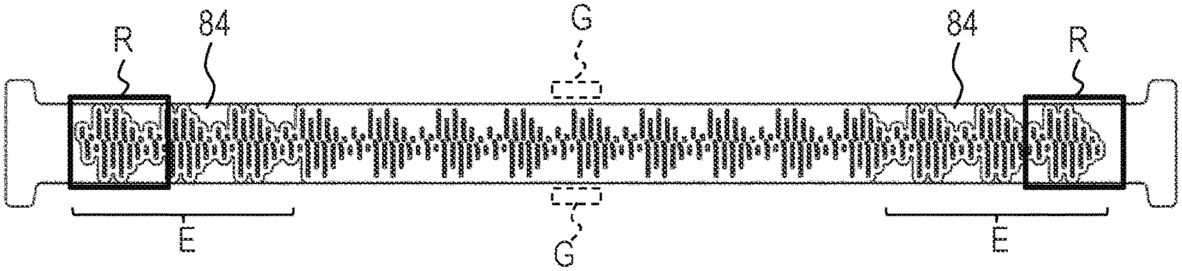
FIG. 11C is a plan view of the liquid flow passage unit according to another modification example.

FIG. 11C is a plan view of a pitch conversion member 8 illustrating Modification Example 7 of Embodiment 2. The lightening portion 84 is provided not in the entire length of the pitch conversion member 8 but only in a part of the region. For example, by not providing the lightening portion 84 in the vicinity of the gate but providing the lightening portion 84 only in a final filling region R where the sink marks are likely to occur or in the vicinity thereof (these are collectively referred to as an end region E), it is possible to keep the overall mold release resistance small and suppress the sink marks at the required sites. In the present embodiment, since the gate G is provided in the central portion of the pitch conversion member 8 in the longitudinal direction (X direction), the deficit portion 84 is provided only in the end region E in the arrangement direction (X direction) of the pitch conversion portion 132.

Figure 12A:
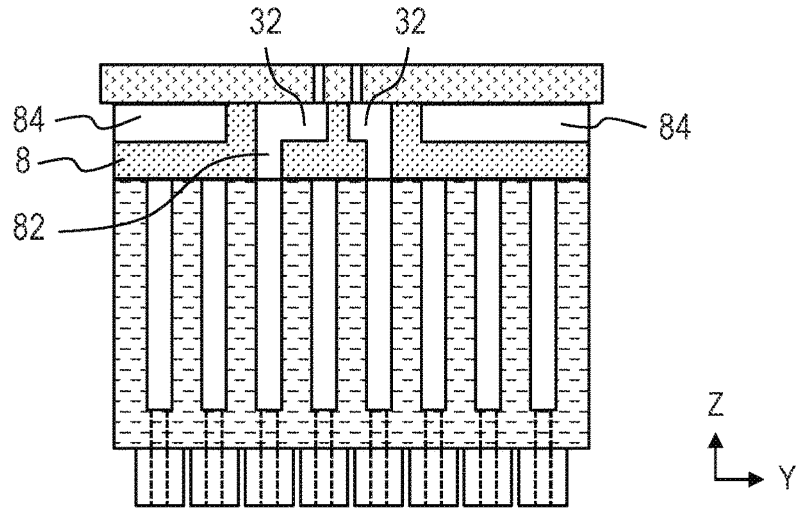
FIG. 12A is a cross-sectional view of the liquid flow passage unit according to another modification example.

In the above two embodiments, the liquid supply passage (and a liquid collection passage) includes the three members of the common flow passage member 7, the pitch conversion member 8, and the substrate connection member 9, but the liquid supply passage may be formed with a different member configuration. In the example illustrated in FIG. 12A, the pitch conversion member 8 includes the pitch conversion flow passage 32 and a communication hole 82. That is, the pitch conversion flow passage 32 and the communication hole 82 that connects the pitch conversion flow passage 32 and the common flow passage 31, are formed of an integrated member (pitch conversion member 8). In this case, lightning from the front surface of the member is possible as in FIGS. 9B and 10B.

Figure 12B:
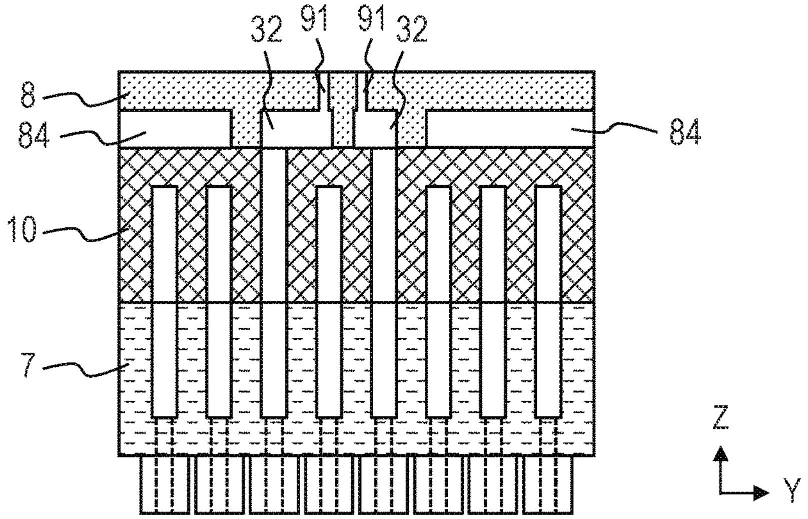
FIG. 12B is a cross-sectional view of the liquid flow passage unit according to another modification example.
Figure 12C:
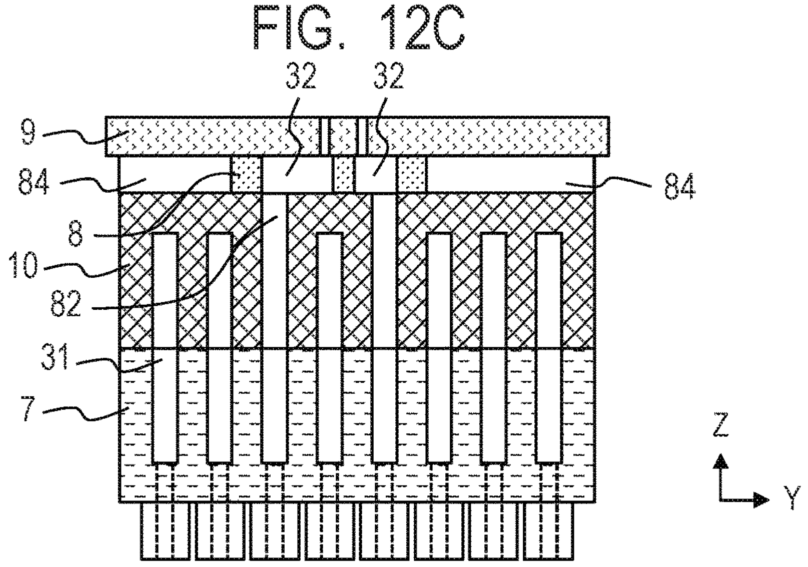
FIG. 12C is a cross-sectional view of the liquid flow passage unit according to another modification example.

In the example illustrated in FIG. 12B, the pitch conversion member 8 includes the pitch conversion flow passage 32 and the substrate connection flow passage 91 that connects the pitch conversion flow passage 32 and the common liquid chamber 22. That is, the pitch conversion flow passage 32 and the substrate connection flow passage 91 are formed of an integrated member (pitch conversion member 8). The pitch conversion flow passage 32 is provided so as to open on a surface of a side opposite to the element substrate 2 side, and the pitch conversion flow passage 32 is formed by joining another member 10 to the surface. The member 10 includes the communication hole 82 that connects the pitch conversion flow passage 32 and the common flow passage 31. In the example illustrated in FIG. 12C, the pitch conversion member 8 includes only the pitch conversion flow passages 32. The pitch conversion flow passage 32 is formed by joining another member 10 to the pitch conversion member 8. That is, a member having the pitch conversion flow passage 32 (pitch conversion member 8), the member 10 having the communication hole 82, and a member having the substrate connection flow passage 91 (substrate connection member 9) are formed as separate members. The both sides of the pitch conversion flow passage 32 are open, and the pitch conversion flow passage 32 is formed by joining the substrate connection member 9 and the member 10 on both sides thereof. In the examples in FIGS. 12B and 12C, a lightening having a certain depth may be provided from the front surface or the back surface of the member, or a lightening penetrating from the front surface to the back surface may be provided.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A liquid ejection head comprising:

an element substrate having a plurality of ejection orifices for ejecting liquid, a plurality of individual liquid chambers corresponding to each ejection orifice of the plurality of ejection orifices, a common liquid supply chamber configured to supply liquid to the plurality of individual liquid chambers, and a common liquid collection chamber configured to collect liquid from the plurality of individual liquid chambers;

a pitch conversion supply path extending in a direction horizontal to the element substrate without branching, connecting with the common liquid supply chamber at a first connecting point, and configured to supply liquid to the common liquid supply chamber;

a common liquid supply path extending in a direction vertical to the element substrate, connecting with the pitch conversion supply path at a second connecting point, and configured to supply liquid to the pitch conversion supply path;

a pitch conversion collection path extending in a direction horizontal to the element substrate and configured to collect liquid from the common liquid collection chamber; and a common liquid collection path extending in a direction vertical to the element substrate and configured to collect liquid from the pitch conversion collection path, wherein the liquid ejection head comprises a plurality of the pitch conversion supply paths each including a bending point where it bends between the first connecting point and the second connecting point.

2. A liquid ejection head comprising:

an element substrate having a plurality of ejection orifices for ejecting liquid, a plurality of individual liquid chambers corresponding to each ejection orifice of the plurality of ejection orifices, a common liquid supply chamber configured to supply liquid to the plurality of individual liquid chambers, and a common liquid collection chamber configured to collect liquid from the plurality of individual liquid chambers;

a pitch conversion supply path extending in a direction horizontal to the element substrate and configured to supply liquid to the common liquid supply chamber;

a common liquid supply path extending in a direction vertical to the element substrate and configured to supply liquid to the pitch conversion supply path;

a pitch conversion collection path extending in a direction horizontal to the element substrate without branching, connecting with the common liquid collection chamber at a first connecting point, and configured to collect liquid from the common liquid collection chamber; and a common liquid collection path extending in a direction vertical to the element substrate, connecting with the pitch conversion collection path at a second connecting point, and configured to collect liquid from the pitch conversion collection path, wherein the liquid ejection head comprises a plurality of the pitch conversion collection paths each including a bending point where it bends between the first connecting point and the second connecting point.

* * * * *